PORTABLE DIGITAL TAPE RECORDER

Filed Aug. 24, 1960 9 Sheets-Sheet 1

INVENTORS
PAUL H. BRINK
HOWARD L. DANIELS
DEAN W. FLYGSTAD
BY
BY Carlsen & Carlsen
ATTORNEYS

INVENTORS
PAUL H. BRINK
HOWARD L. DANIELS
DEAN W. FLYGSTAD
BY

BY Carlsen & Carlsen
ATTORNEYS

PORTABLE DIGITAL TAPE RECORDER

Filed Aug. 24, 1960 9 Sheets-Sheet 3

INVENTORS
PAUL H. BRINK
HOWARD L. DANIELS
DEAN W. FLYGSTAD
BY
BY Carlsen & Carlsen
ATTORNEYS INVENTORS
PAUL H. BRINK
HOWARD L. DANIELS
DEAN W. FLYGSTAD
BY Carlsen & Carlsen
ATTORNEYS

PORTABLE DIGITAL TAPE RECORDER

INVENTORS
PAUL H. BRINK
HOWARD L. DANIELS
DEAN W. FLYGSTAD
BY
BY Carlsen & Carlsen
ATTORNEYS Sept. 10, 1963 H. L. DANIELS ETAL 3,103,401

PORTABLE DIGITAL TAPE RECORDER

Filed Aug. 24, 1960 9 Sheets-Sheet 6

INVENTORS
PAUL H. BRINK
HOWARD L. DANIELS
DEAN W. FLYGSTAD
BY Carlsen & Carlsen
ATTORNEYS Sept. 10, 1963 H. L. DANIELS ETAL 3,103,401

PORTABLE DIGITAL TAPE RECORDER

Filed Aug. 24, 1960 9 Sheets-Sheet 7

INVENTORS
PAUL H. BRINK
HOWARD L. DANIELS
DEAN W. FLYGSTAD
BY Carlsen & Carlsen
ATTORNEYS INVENTORS
PAUL H. BRINK
HOWARD L. DANIELS
DEAN W. FLYGSTAD
BY Carlsen & Carlsen
ATTORNEYS

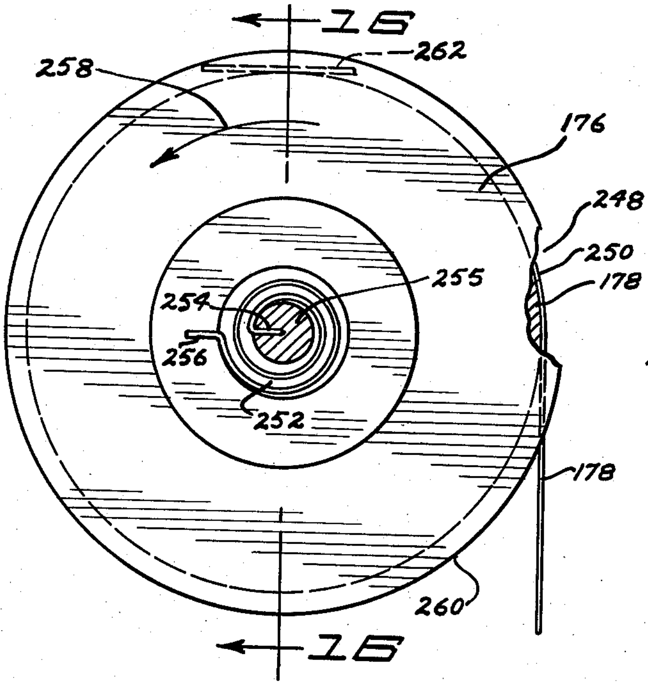
FIG. 15
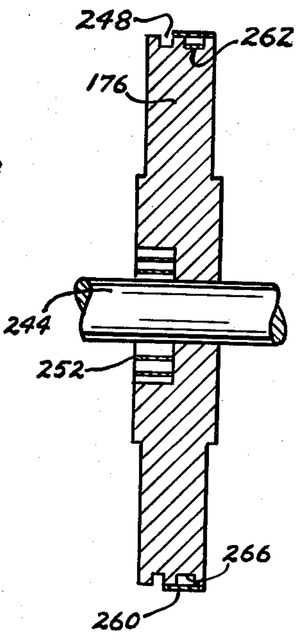
FIG. 16
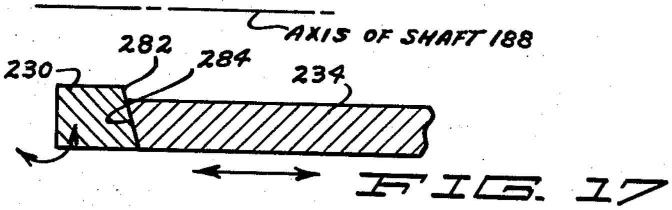
INVENTORS
PAUL H. BRINK
HOWARD L. DANIELS
DEAN W. FLYGSTAD
BY Carlsen & Carlsen
ATTORNEYS 3,103,401
PORTABLE DIGITAL TAPE RECORDER Howard L. Daniels, West St. Paul, Paul H. Brink, St. Paul, and Dean W. Flygstad, Roseville, Minn., assignors, by mesne assignments, to The Telex Corporation, Tulsa, Okla., a corporation of Delaware
Filed Aug. 24, 1960, Ser. No. 51,654
30 Claims. (Cl. 346—17)

The present invention relates to dial input tape recorders, particularly to hand carried recorders which are mechanically actuated by a shelf-checking dial input.

With the relatively recent increase in mechanization of business operations there has been a bottle-neck developed in the flow of information between the information source and the data processing equipment. It is the usual practice to record information on hard copy, such as a notebook, and then transfer such information by the means of a manually actuated punch or other device to punched cards or magnetic tape. It should be readily apparent that if the information is initially recorded on media usable by such data processing equipment, the bottle-neck would be eliminated.

Large utility companies presently use the above described procedure in reading their various meters, transpose the meter reading and account number onto punched cards or the like, use mechanized equipment to read the cards and compute the billing for each account and then the equipment prints out the statement for mailing. The present invention provides a data recorder which may be easily carried by a meter reader and has a self-contained magnetic tape or equivalent storage media for recording indicia of the account number and meter reading. The meter reader merely dials the account number and the meter reading for automatically recording the indicia on the tape. Upon returning to the central office, the tape is removed from the recorder and inserted into a suitable sensing device to be automatically read. To ensure against dialing errors, the recorder is constructed such that the operator, or meter reader, can easily detect errors. This is termed a "self-checking" input feature.

According to one version of the present invention a manually rotatable dial, similar to a telephone dial, is provided with a manually actuated switch disposed adjacent to the finger detent on the dial housing for closing an electrical circuit to automatically record the symbol dialed. A commutator disk is operatively associated with the rotatable dial for converting the angular position of the dial into a binary code indicative of the symbol dialed. Adjacent to the disk there is provided a stationary contact plate which is electrically associated with lighting means adjacent the dial housing face for illuminating a symbol indicator corresponding to the symbol dialed to provide the operator with a visual indication of the number being recorded.

The invention also provides, in combination with the dial input mechanism, a novel tape advance mechanism actuated by the input mechanism. The dial has a shaft with a radially-outwardly extending arm which has a pawl for engaging a rachet wheel to move a tape drive roller a predetermined and constant angular amount each time the dial is rotated irrespective of the angular displacement thereof. All of the tape drive parts are disposed co-axially with the shaft for forming a compact arrangement.

A modification of the present invention provides for storing a plurality of dialed symbols on the face of the recorder such that the operator has an indication of the symbols previously dialed.

A plurality of selectively rotatable indicia bearing wheels are mounted with a small outer peripheral portion exposed to the front of the recorder. A flexible tape operatively connects each of the wheels to respective pulleys rotatably mounted upon a hollow shaft which is operatively associated with the dial. The shaft has an axially elongated key-way adjacent a dog in each of the respective pulleys. An axially movable key is non-rotatably secured to the inner side of the shaft for operatively engaging one pulley to rotate one of the respective wheels. The key is operatively associated with the tape drive mechanism for being axially moved from one pulley to the next each time the dial is rotated. With this apparatus the entire number that is recorded on the tape is shown on the wheels.

Reset means are provided for moving all of the wheels to a predetermined initial position. Firstly, the dial has one angular position for indicating "end of message" and when this is dialed a lobe or cam on the shaft actuates the reset mechanism to clear all of the wheels to the initial position. Manually resetable means are also provided.

Accordingly, it is an object of the present invention to provide a compact and simplified manually actuated data recorder.

It is another object of the present invention to provide a rotatable dial actuated tape recorder which has self-checking input characteristics.

It is a further object of the present invention to provide a compact memory-tape drive-mechanism which is operative to move a tape a predetermined and constant amount in response to a various angular displacement of a dial input mechanism.

It is a still further object of the present invention to provide a dial input mechanism having a manually actuated recording switch adjacent the dialing mechanism for causing the symbol dialed to be automatically recorded on a record media.

It is still another object of the present invention to provide a compact mechanical symbol accumulating register which has its actuating means co-axially disposed with respect to a dial input mechanism.

It is still another object of the present invention to provide a compact and simplified commutator for selectively transferring dial input mechanism rotations to one of a plurality of indicia bearing wheels.

It is still a further object of the present invention to provide a combined memory media drive and a mechanical register commutator mechanism which is actuated to move constant distances in response to input dial rotations of various angular displacements.

These and other more detailed and specific objects will be disclosed in the course of the following specification, reference being had to the accompanying drawings, in which—

FIG. 15 is an enlarged elevational view of one of the register symbol-indicia bearing wheels as rotatably mounted on a non-rotatable shaft.

FIG. 16 is a vertical sectional view taken in the direction of the arrows along the line 16—16 in FIG. 15.

FIG. 17 is an enlarged partial sectional view taken in the direction of the arrows along the line 17—17 in FIG. 11 and showing the axial gradient of the camming surfaces used to convert the dial shaft rotation into translational movement for resetting the commutating apparatus.

Figures 1, 2:
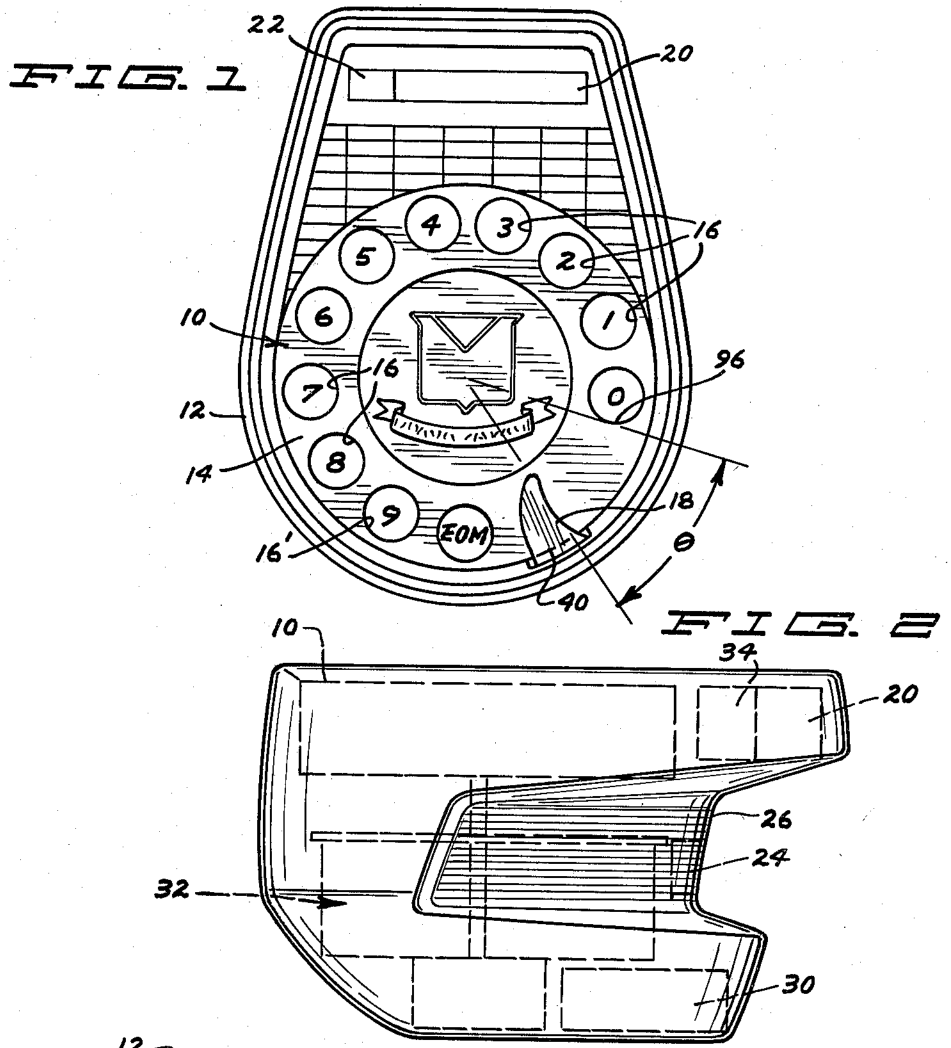
FIG. 1 is a plan view of an exemplary embodiment of the present invention shown in approximate actual size.
FIG. 2 is a side elevational view of the FIG. 1 apparatus and showing the exemplary placement of parts therein.
Figure 3:
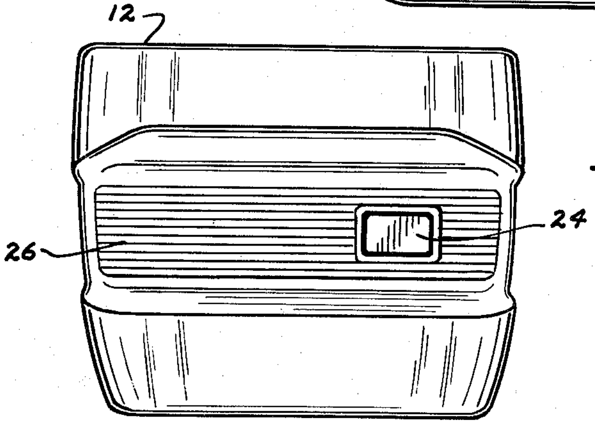
FIG. 3 is an end elevational view of the FIG. 1 apparatus and showing a dial light actuating button.

With more particular reference now to FIGS. 1, 2 and 3 there is shown a compact data recorder having the input dial mechanism 10 mounted adjacent the top surface of a case 12 and having a manually rotatable dial 14 with a plurality of finger receiving apertures 16. Each of the apertures 16 is indicative of a symbol to be dialed, such as the symbols indicated in FIG. 1. To dial a symbol the operator inserts his finger into a selected one of the apertures, such as 16′, and rotates the dial until his finger engages a finger detent 18 as in the curved portion at which time an electrical switch is actuated to the closed position for recording the symbol dialed and providing a visual indication of the symbol in the means 20 to the operator as will become apparent.

An error button 22 is provided to actuate later described mechanism for eradicating missdialed symbols from the record media. Also the invention provides for illuminating the various symbol indications which may be seen through the aperture 16 as by depressing the actuator button 24, (FIG. 3).

As best seen in FIG. 2 the case 12 has a recessed portion 26 adapted to receive an operator's hand to facilitate carrying the recorder. The recorder may be held by placing the thumb on one side of the case 12 and the fingers on the opposite side with the palm being positioned over the portion 26. The operator's other hand is then free to operate the dial 14 for inserting information and actuating the recorder. Note that the operator can by merely squeezing his hand against the case 12 move the button 24 to light the dial.

The recording tape is held in a container 30 toward the lower part of the case 12 with the tape extending over actuating mechanism 32 which is co-axially disposed with respect to the dial mechanism 10 for reducing the size of the recorder. A small battery 34 is suitably mounted between the dial mechanism 10 and the indicating means 20. As shown the recorder occupies a minimum of space.

Figures 4, 5, 7:
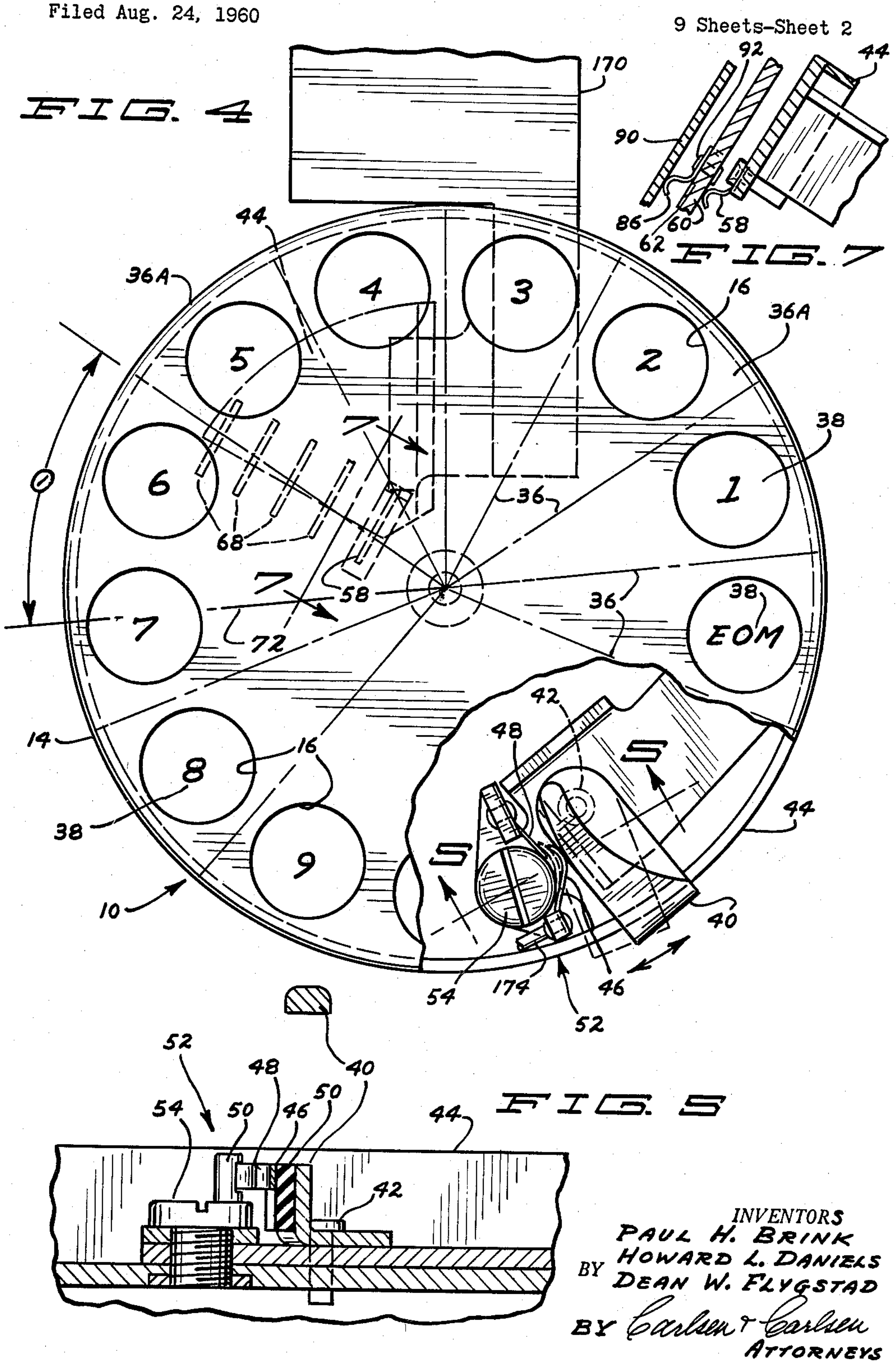
FIG. 4 is a greatly enlarged and cut-away plan view of an exemplary dial input mechanism for use in the FIG. 1 apparatus.
FIG. 5 is an enlarged vertical sectional view taken in the direction of the arrows along the line 5—5 in FIG. 4 and showing one form of an actuating switch operatively associated with the dial finger-detent.
FIG. 7 is an enlarged partial vertical sectional view taken in the direction of the arrows along the line 7—7 in FIG. 4 and showing the brush arrangement used in providing an electrical circuit to illuminate the dial symbol indications.
Figure 6:
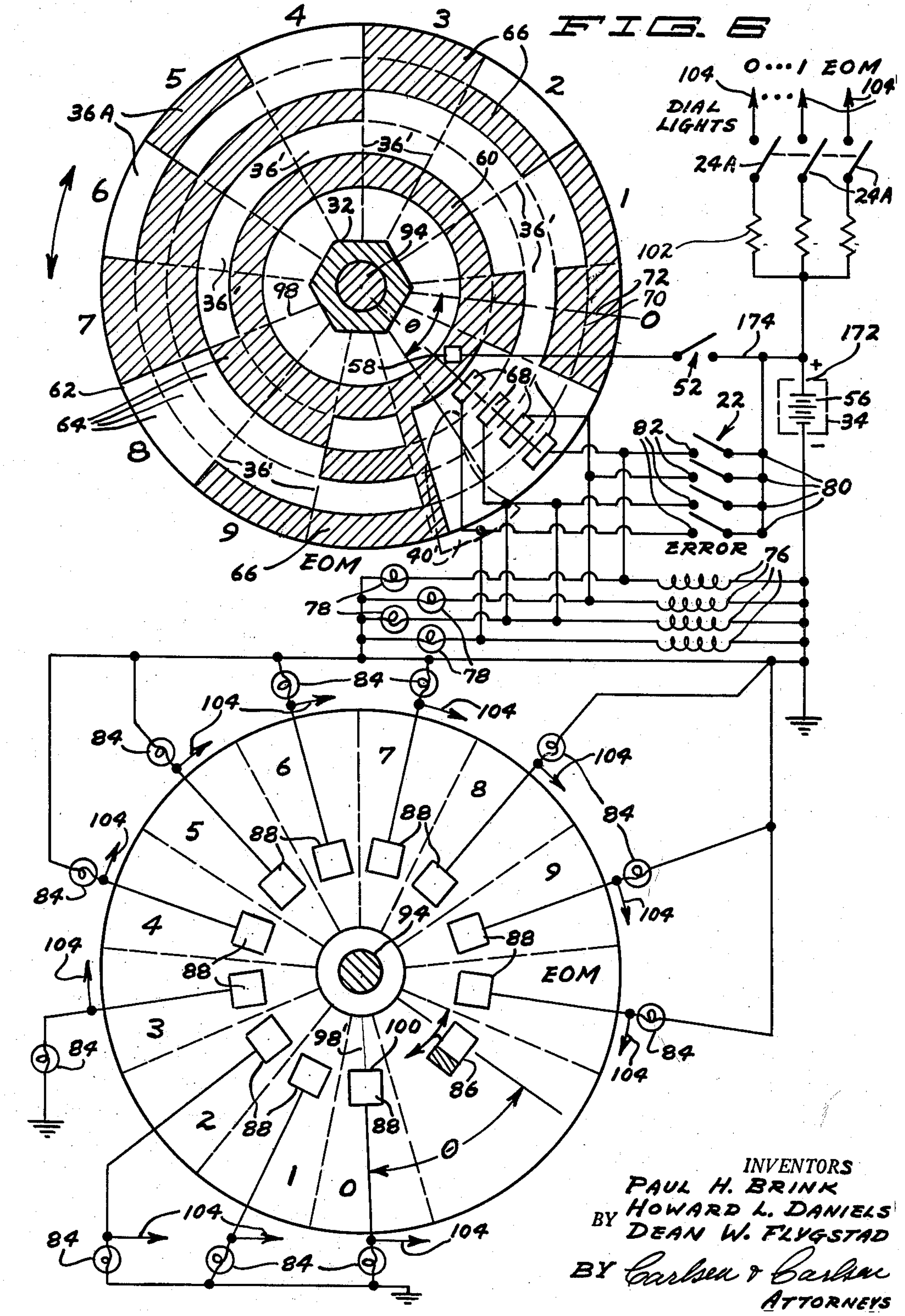
FIG. 6 is a diagrammatic showing of an encoding commutator and the apparatus used to illuminate a selected symbol indicator in response to the selected symbol being dialed.

The input portion of the FIG. 1 recorder is best understood by referring to FIGS. 4 through 6. As shown in FIG. 4 by the respective dotted lines 36 there are formed a plurality of angular sections 36A, each of which when the dial 14 is in its rest position has a single aperture 16 disposed thereover and is indicative of the symbols 38 respectively shown in the sections. As the operator's finger rotates the dial member 14 in a clock-wise direction, the finger engages the finger detent 40 at the end clockwise extremity of the dial movement. The detent 40, pivotably secured as at 42 to the dialing housing 44, is pivoted counter clockwise as the finger engages the detent for moving the spring arm member 46 into an electrical contact-making engagement with the stationary spring arm 48. The spring arms are suitably secured to the respective insulating and upstanding members 50 for forming a normally open and momentary contact electrical switch 52. The switch 52 so-formed is secured to the housing 44 as by the flat head screw 54.

The input circuitry is shown in schematic form in FIG. 6 wherein the switch 52 is shown as connecting a terminal of a battery 56 in the source 34 to a brush 58 which is continuously slidably engaged with the annular conductive portion 60 formed on one side of the commutator disk 62. As will become apparent, the disk 62 is operatively associated with the member 14 such that it will always rotate a like angular displacement. The disk 62 has four annular portions 64 of different radaii and which are divided into angular sections corresponding to the dial 14 sections 36A and as indicated by the dash line 36′. From inspecting the disk it should be apparent that the conductive portion 66 (indicated by shading lines) are so-arranged to provide a binary code indicative of the respective angular sections—the conductive portions 66 indicating a "1" and the insulating portions a "0."

For clarity the arbitrarily assigned numerical values to the respective sections are indicated adjacent the disk 62. The value "zero" is arbitrarily indicated by a binary number equal to the decimal value 10 while the remaining numbers have a true binary number representation. The radially-outermost annular portion corresponds to the binary digit value $2^0$ while the other portions are assigned increasing binary values. The angular section 66 contains the binary code representing decimal 11 which is used to indicate "end of message" (EOM). It is important for a later described embodiment that the section 66 is located to provide the greatest angular displacement of the dial.

To encode the symbol dialed four brushes 68 are disposed in respective radial positions over the annular portions 64 for completing an electrical circuit as will now be described. For purposes of discussion, assume that the symbol "0" has been dialed causing the section 70 to be adjacently under the brushes 68. With the switch 52 closed, a circuit is completed from the brush 58 through the illustrated conductive areas 72 through the respective brushes 68; thence over the respective lines to the recording heads 76, and thence to the opposite terminal of the battery 56. A second circuit portion including the lamps 78 is disposed in parallel relation to the respective head 76 for providing a visual indicating of the binary signal being recorded. In one version of the invention the four lamps 78 constitute the means 20. It should be readily apparent that by variably rotating the dial 14 anyone of the indicated symbols will be recorded through the head 76 as indicated by the arbitrarily selected binary code signals.

The error button 22 actuates a four section switch each of which has one of its terminals 80 connected to a battery 56 terminal and the other end 82 connected respectively to the heads 76 for recording a signal therethrough. This records a "1" in each record position to eradicate any code which may be recorded therein at the particular symbol location as will be later explained.

Each symbol dialed is visually indicated by illuminating one of the lamps 84 through an electrical circuit closed by the brush 86 (FIG. 7) on the disk 62 slidably engaging one of the contact areas 88 (FIG. 6) on the stationary plate 90. The remainder of the circuit includes the switch 52, the brush 58 and the annular portion 60 all in series. A revet 92 (FIG. 7) connects the portion 60 on one side of the disk 62 to the brush 86 on the opposite side thereof.

Figures 9, 10:
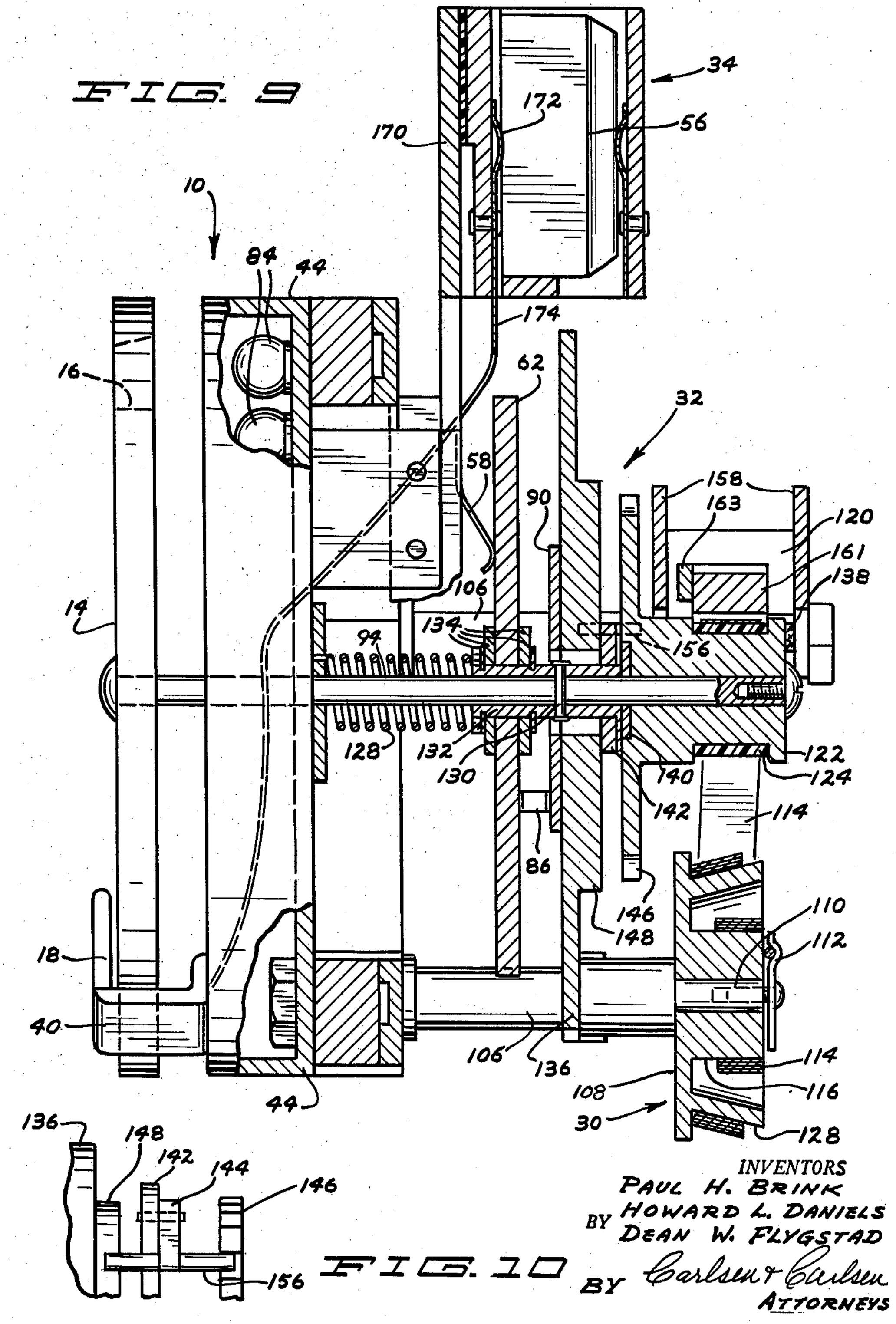
FIG. 9 is a vertical sectional view taken in the direction of the arrows along the line 9—9 in FIG. 8 and illustrating the co-axial arrangement of parts in the illustrated recorder.
FIG. 10 is a simplified and enlarged diagrammatic view of the tape drive constant displacement mechanism used in the FIG. 8 illustrated apparatus.

As best seen in FIG. 9, the disk 62 and plate 90 are disposed co-axially about the dial drive shaft 94 and are axially adjacent to each other. The lights 84 are suitably mounted within the housing 44 and are adjacently below the respective symbols 38 indications on the housing 44. By making the dial 14 transparent the illuminated symbol 38 is easily visible therethrough for providing a positive indicator to the operator which symbol has been dialed to provide a compact self-checking dial input mechanism.

The angular relationship between the finger detent 40, the disk 62 and the plate 90 will now be described. As best seen in FIG. 1 the angle is the angular spacing between the aperture 96 (the counter-clockwise closest aperture) and the detent 40 to represent the least amount of movement required to dial a symbol. The brushes 68 are spaced clockwise from the center line 98 of the angular portion 70, an angle equal to the angle $\theta$. The relative circumferential location of the finger detent 40 is shown in dotted line in FIG. 6; that is, the actual location of the brushes 68 with respect to the detent 40 is unimportant, rather the angular displacement between the line 98 and the brushes 68 must equal the displacement between the closest aperture 16 to the curved portion 18 on the detent 40. It should be apparent that by causing the disk 62 to rotate clockwise through an angle $\theta$ will place the center line 98 of the section 70 directly under the brushes 68 for indicating the symbol "0." Similarly the brush 86 is disposed from the center line 98' of the section 70' on the plate 90 such that as the disk 62 is rotated clockwise through an angle $\theta$ the brush 86 will move to the contacting portion 100 for illuminating the corresponding dial light 84. Note that the relative movement between the disk 62 and the plate 90 requires that the symbols be located in an opposite direction to that in the disk 62.

Since the portable recorder, when being used for recording meter readings and the like, will be used in unlighted areas, such as basements, it is necessary to illuminate the symbols. A plurality of voltage dropping resistors 102 are connected to battery 56 through the respective switch sections 24A and are connected to the respective lamps 84 as indicated by the arrows 104. The button 24 (FIG. 3) is depressed to close all of the switch parts 24A. The resistances 102 decrease the voltage sufficiently such that the lamps 84 are only dimly lit. When a symbol is dialed, closing the switch 52, the lamp 84 used to illuminate the dialed symbol 38 will have a light intensity greater than the other symbols due to the direct connection to the battery 56 and thus will still indicate which symbol has been dialed.

Paying more particularly reference now to FIGS. 8 and 9, the tape drive mechanism will be described. It should be borne in mind that the new described drive mechanism may be used to actuate a latter described symbol accumulating register. The dial housing 44 has three depending studs 106 for supporting the tape drive mechanism in the position shown in FIG. 2. A dual tape spool 108 forming a tape container 30 is mounted on a stud 110 formed on the frame 136 and held axially in place by the clamp-held pin 112. The tape 114 moves from the inner race portion 116 over the outward idler wheel and thence past the recording head assembly 120 which holds the recording windings 76 (FIG. 6) in magnetizing relationship to the tape 114. From the head assembly the tape is disposed over the tape drive roller 122, having the hard rubber annular inset 124, and thence the pulley 126 and back into the spool 110 on the outer race 128 thereof. As dial 14 is actuated the tape is moved in the above described direction as will become apparent.

The dial 14 is non-rotatably secured to the shaft 94 which is rotatably mounted through a suitable bearing (not shown), in the housing 44. A coil spring 128 is secured at one end to the shaft 94 and the other end being secured to the housing 44 such that as the dial 14 is rotated away from its rest position the spring will be operative to return same to the initial position. A pin 130 extends through the shaft 94 for non-rotatably securing a non-circular shim 132 thereto. The disk 62 is disposed co-axially about the shaft 94 and is non-rotatably held thereto by the shim 132 with a pair of washers and snap rings 134 holding the disk 62 axially in place. The stationary contact plate 90 is secured to the frame member 136 which is supported by the studs 106. Note that the members 90 and 136 have an aperture for permitting the shaft 94 to rotatably extend therethrough. The drive roller 122 is rotatably disposed about the lower end portion of the shaft 94 and has a friction member 138 disposed against a member stationarily supported by the frame member 136 for inhibiting rotation thereof, with the shaft 94. A suitable thrust bearing 140 is disposed between the shim 132 and drive roller 122.

The rachet mechanism for driving the roller 122 a predetermined and constant amount for each rotation of the dial 14 will now be described. A radially extending arm 142 is non-rotatably secured to the lower end portion of the shim 132 and has the radially inwardly spring-biased pawl 144 for engaging the rachet wheel 146 to move same in a first direction with the shaft. As shown, the roller 122 and wheel 146 may be integrally formed. A stationary cam member 148 is integrally formed on the frame 136 and has a radially extending camming surface 150 for moving the pawl 144 radially outward such that it will be disengaged from the rachet wheel 146 after initial rotation of the dial 14.

Figure 8:
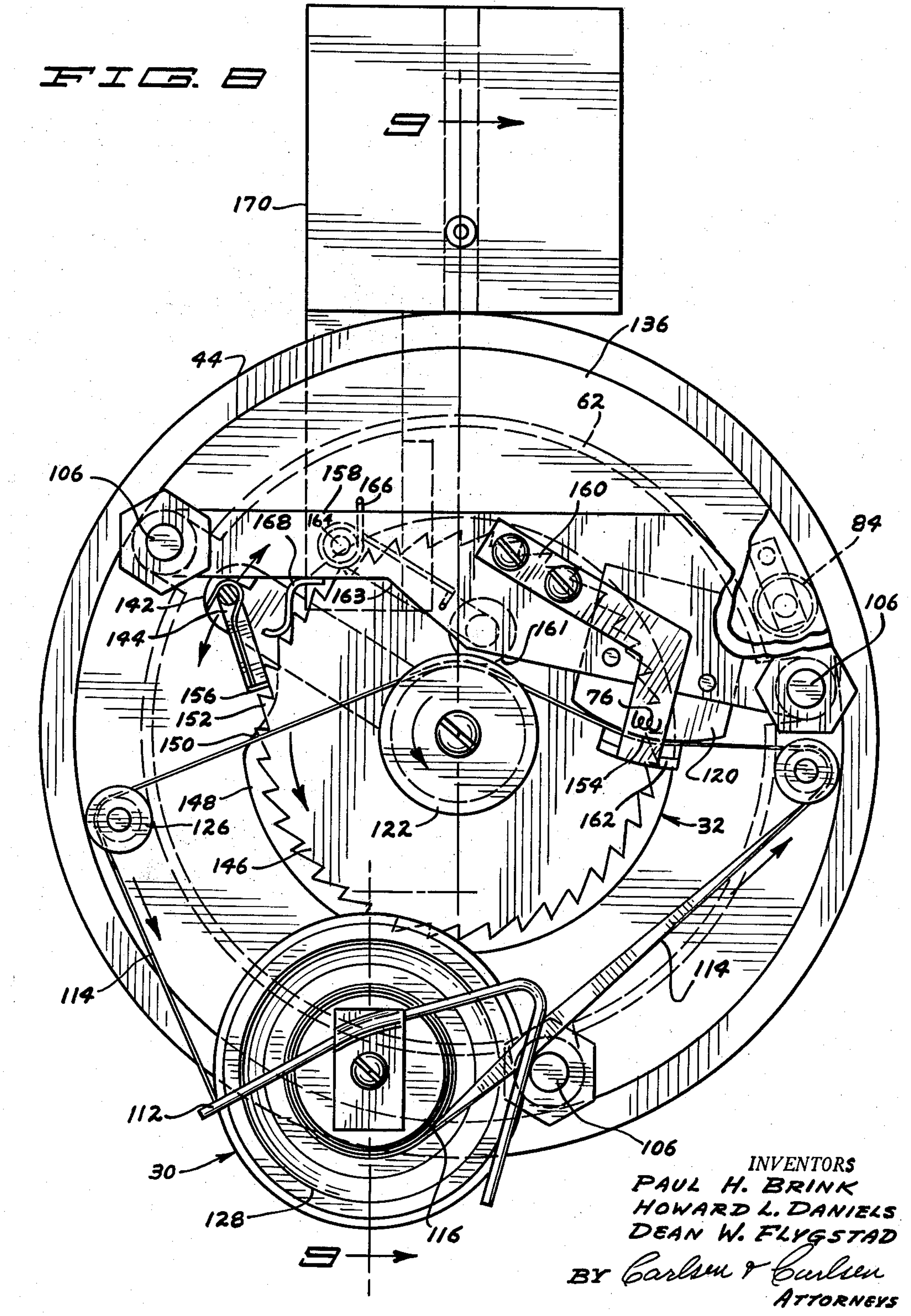
FIG. 8 is an inverted plan view of the FIG. 4 illustrated mechanism and showing the tape drive arrangement.

In FIG. 8 the pawl 144 is shown with the dial 14 in its rest position. Note there is a small space between the rachet tooth 152 and the pawl for providing increased tolerances in manufacturing the recorder. The ratchet tooth 152 is disposed from the radially outward end of the camming surface 150 an angle $\phi$ which is not greater than the angle $\theta$. From this it can be seen that the pawl 144 will be disengaged from the rachet wheel 136 before the operator's finger will engage the finger detent switch 140 for making the recording. Accordingly, the tape advance is completed by rotating the dial 14 before any symbol can be recorded on the tape 114, the tape being stationary during recording.

The radius of the wheel 146, together with the angle $\phi$ and the radius of the insert 124 on roller 122 determine the distance the tape 114 will be advanced for each dial 14 rotation. In the illustrated embodiment this advance was arbitrarily chosen at 1/40 of an inch. Accordingly, each portion of the tape 114 which is 1/40 of an inch long its length can record one symbol and is thus termed a symbol portion. It is understood that the recording heads 76 are disposed transversely to the tape for recording the binary digits thereacross in the usual manner. Depression of the error button 22 records binary 1's in all digits in the one symbol portion which is adjacent the recording head assembly, as at 154, as shown in FIG. 8 and as has been described with reference to FIG. 6.

As best seen in FIG. 10 the pawl 144 has an axially extending engaging portion 156 for respectively engaging the ratchet wheel 146 and the cam 148 on the opposite sides of the arm 142 as aforedescribed.

Upon completion of the recording the operator removes his finger from the dial 14 permitting the spring 128 to return the dial to the rest position. The pawl 144 is returned to the illustrated position while the switch 52 is opened before the brushes 68 contact a section 36A adjacent the section 36A which represented the symbol dialed. Note the drive actuation of the tape occurs at the initial portion of the dial rotation and the recording is accomplished at the point of maximum dial rotation with nothing being actuated on the return of the dial 14 to its initial position. It is to be understood that it is intended the present invention include embodiments utilizing such return stroke provided such is covered by the appended claims.

The constructional details will be further clarified by referring to FIG. 9 wherein it is shown that the bracket 158 is mounted on the lower ends of two studs 106 and stationarily supports the head assembly 120 in the illustrated position. The bracket 160 holds the member 162 in closely spaced-apart relation to the assembly 120 for forcing the tape 114 thereagainst. The roller 161 is mounted on the arm 163 which is pivotally secured to the bracket 158 as at 164. A spring 166 is operatively connected between the arm 162 and the bracket 158 for yieldably urging the roller 160 against the drive roller 122 such that the tape 114 will be moved by rotation thereof. To ensure that the roller 122 has no back lash the spring detent 168 is attached to the bracket 158 and engages the ratchet wheel 146 for preventing back rotation thereof.

It is apparent that the tape drive mechanism, the commutator apparatus and the symbol indicating devices are all co-axial about the shaft 94 and therefore require a minimum of space as described for FIG. 2. For completing the compact arrangement the battery 34 is held in the FIG. 2 illustrated position by the bracket 170 which is secured to the dial housing 44.

The terminal 172 of the battery 34 is connected to the switch 42 as by the lead 174. The other terminal of the battery is grounded to the dial housing as schematically illustrated in FIG. 6.

Thus there has been shown a manually self-checking dial input mechanism drive mechanism for moving it from one symbol position to the next. In operating the just described recorder for the purposes of meter reading, and "end of message" (EOM) symbol may be first dialed, then the account or reference number may be dialed followed by the meter reading, and finally the message completed by dialing an "end of message" symbol.

In many applications of the present recorder it may be desired that a plurality of the symbols dialed will be held in a register for review by the operator, such that the operator, by referring to such register may determine just what symbols have been dialed. To fulfill such a need the following described modification of the present invention is provided. The general arrangement of parts within the case 12 remains essentially the same, the only change being in the indicator means 20 and the addition of mechanical register input and commutating means. Instead of the four binary signal indicating lights 78, ten symbol bearing wheels 176 (FIGS. 11–17) are rotatably mounted in the case 12 with each wheel having all of the symbols 38 disposed thereon in circumferentially spaced-apart relation. A cord 178 (only one of which is shown for clarity) is fixedly attached to each of the wheels 176 and is slidably disposed through one of the apertures 180 in the guide 182, thence through a similar aperture in the guide 184 to a selectively rotatably pulley wheel 186 rotatably disposed over the tubular shaft 188. The shaft 188 is non-rotatably secured to the dial 14 in the same manner as the shaft 94 and rotatably extends through a bearing (not shown) the dial housing 44. The commutator disk 62 is non-rotatably secured to the shaft 188 while the frame member 136 is maintained in the same relationship to the disk 62 as aforedescribed. The tape drive apparatus 32 including the roller 122 remains unchanged except that a later discussed serrated clutch face 190 is provided at the lower end thereof. The dial 14 return spring is changed from the FIG. 9 illustrated coil or helical spring 28 to that of a spiral or clock type spring 192 which provides space for the pulleys 186 without increasing the axial length of the recorder.

Figure 11:
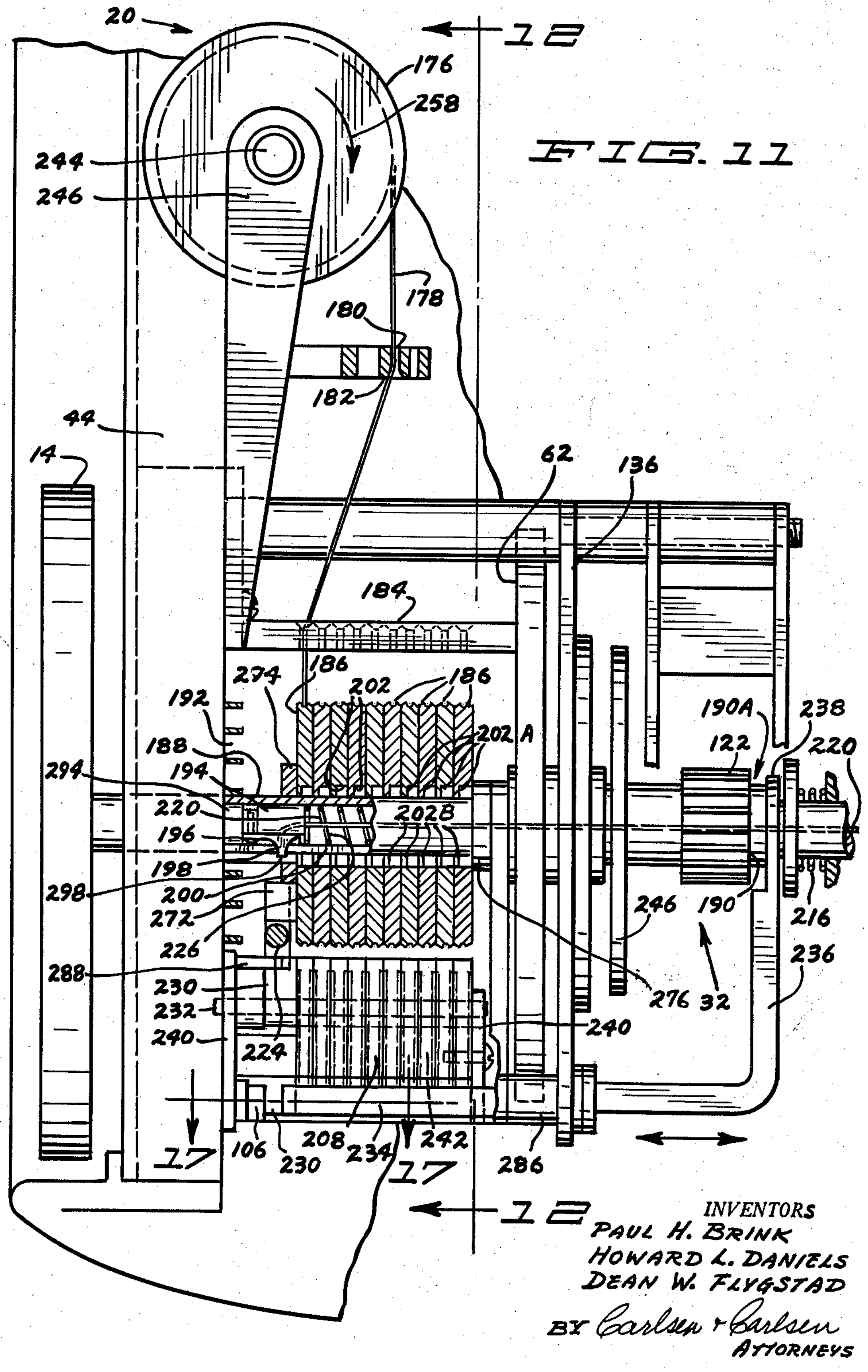
FIG. 11 is an enlarged side view having cut-away portions of the FIG. 4 apparatus with a mechanical symbol-accumulating and automatically-resettable register together with its dial actuated and commutating input apparatus.
Figure 12:
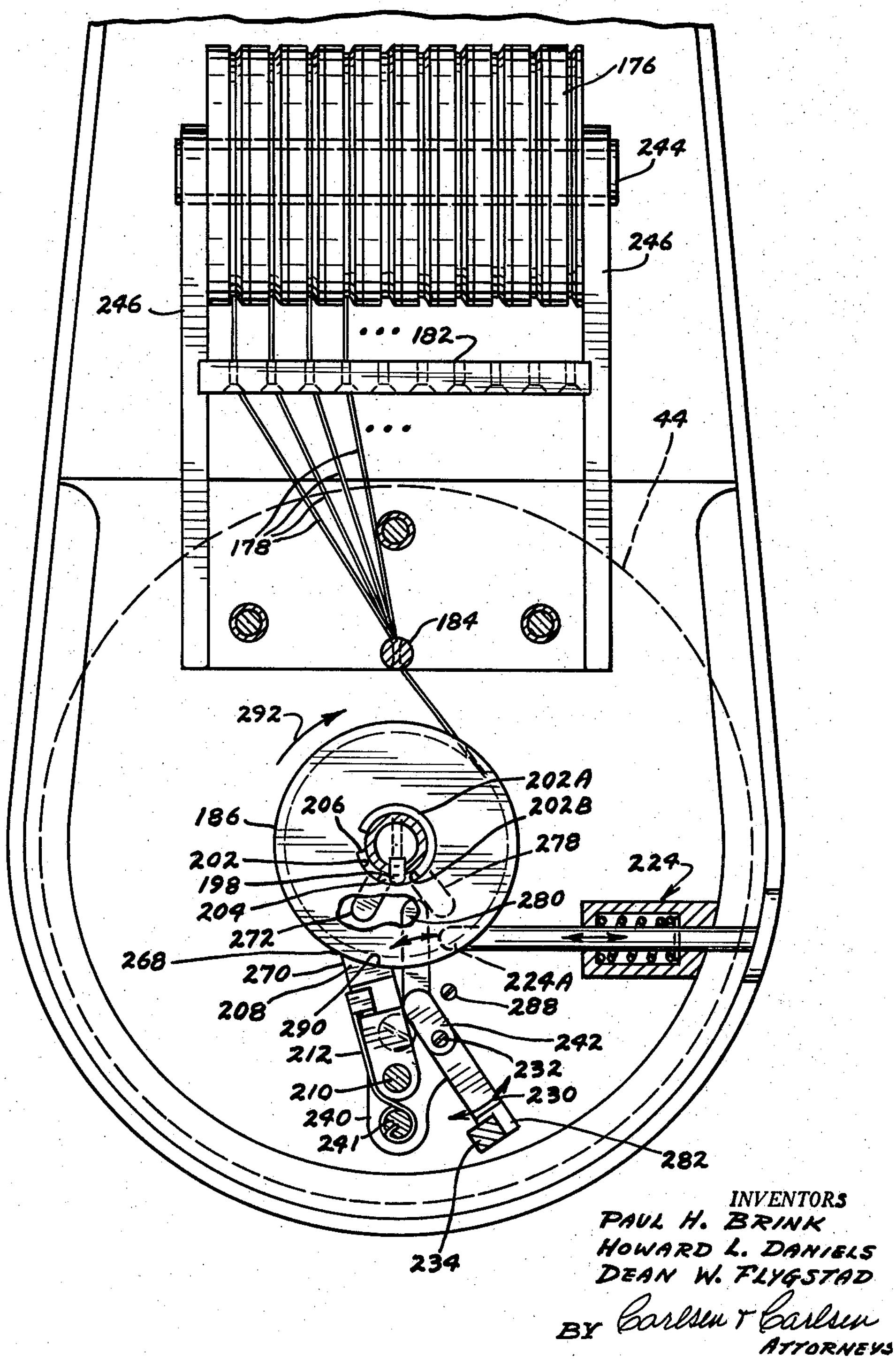
FIG. 12 is a vertical sectional view taken in the direction of the arrows along the line 12—12 in FIG. 11 and showing the mechanism used to selectively rotate the wheels in the FIG. 11 mechanical register together with the resetting mechanism.

As clearly shown in FIG. 11 the symbol bearing wheels 176 are rotatable about an axis perpendicular to the axis of the pulleys 186 and the drive shaft 188. It is the function of the two guides 182 and 184 to transfer the respective cords 178 in an orderly spaced-apart relation between the two axes in a fan-like manner as shown in FIG. 12 for a few of the cords 178.

The pulleys 186 are selectively rotated an angular amount equal to the dial 14 rotation by an axially movable key 194 non-rotatably disposed inside of the tubular shaft 188 and being axially moved by later described apparatus operatively associated with the tape drive mechanism. As best seen in FIG. 12 the key 194 includes the bolt 196 fixedly attaching the radially extending tooth 198 to the key 194 and which is disposed through the axially elongated slot 200 formed in the shaft 188. The tooth 198 holds the key 194 against rotation with respect to the shaft 188 as well as operatively engaging the pulleys 186 for rotating same. Each of the pulley wheels 186 is provided with a radlially inward opening groove 202, (FIG. 12) disposed adjacent the tooth 198 for removably receiving same. When the tooth 198 is aligned with one of the pulleys 186, it is operative to rotate the one pulley an angular displacement equal to the dial 14 rotation. An engaging edge 204 of the tooth 198 is spaced from the mating engaging surface 206 of the pulley 186 an angle equal to the angle $\theta$ plus the angle associated with the portion 70 (indicative of the symbol zero) for providing sufficient lost motion to permit the wheels 176 to remain non-rotated until the second closest symbol (decimal 1) to the detent 40 is dialed. As will become apparent, this arrangement permits the key 194 to be axially moved from one pulley to the next adjacent pulley wheel before it operatively engages the edge 206 for rotating same. By paying close attention to FIGS. 11 and 12 it should be noted that a radially inward flange 202A is formed on each pulley 186 at its upward side for maintaining the concentricity of the pulleys 186 with respect to the shaft 188. A slot 202B is provided in the flange 202A in a circumferential location at which it is aligned with the shaft axially elongated slot 200 when the respective pulley is in the so-called rest position. The key tooth 198 axially moves through the arcuate slot 202B when being aligned with said pulley as will become apparent.

Note each groove 202 extends almost circumferentially around the radial inner edge of the respective pulley 186 for permitting the tooth 198 to back rotate therein after the pulley has been rotated to register a symbol in the indicating means. This is necessary to permit the dial 14 to return to its rest position after the operator has removed his finger therefrom after dialing a symbol to be recorded.

A brake 208 is provided for each of the pulleys 186 for inhibiting rotation thereof with the shaft 188. The detent stud 210 pivotably supports the brakes 208 for permitting the spring 212 to yieldably urge the brakes to frictionally engage the respective pulleys as will be more fully later explained.

Figures 13, 14:
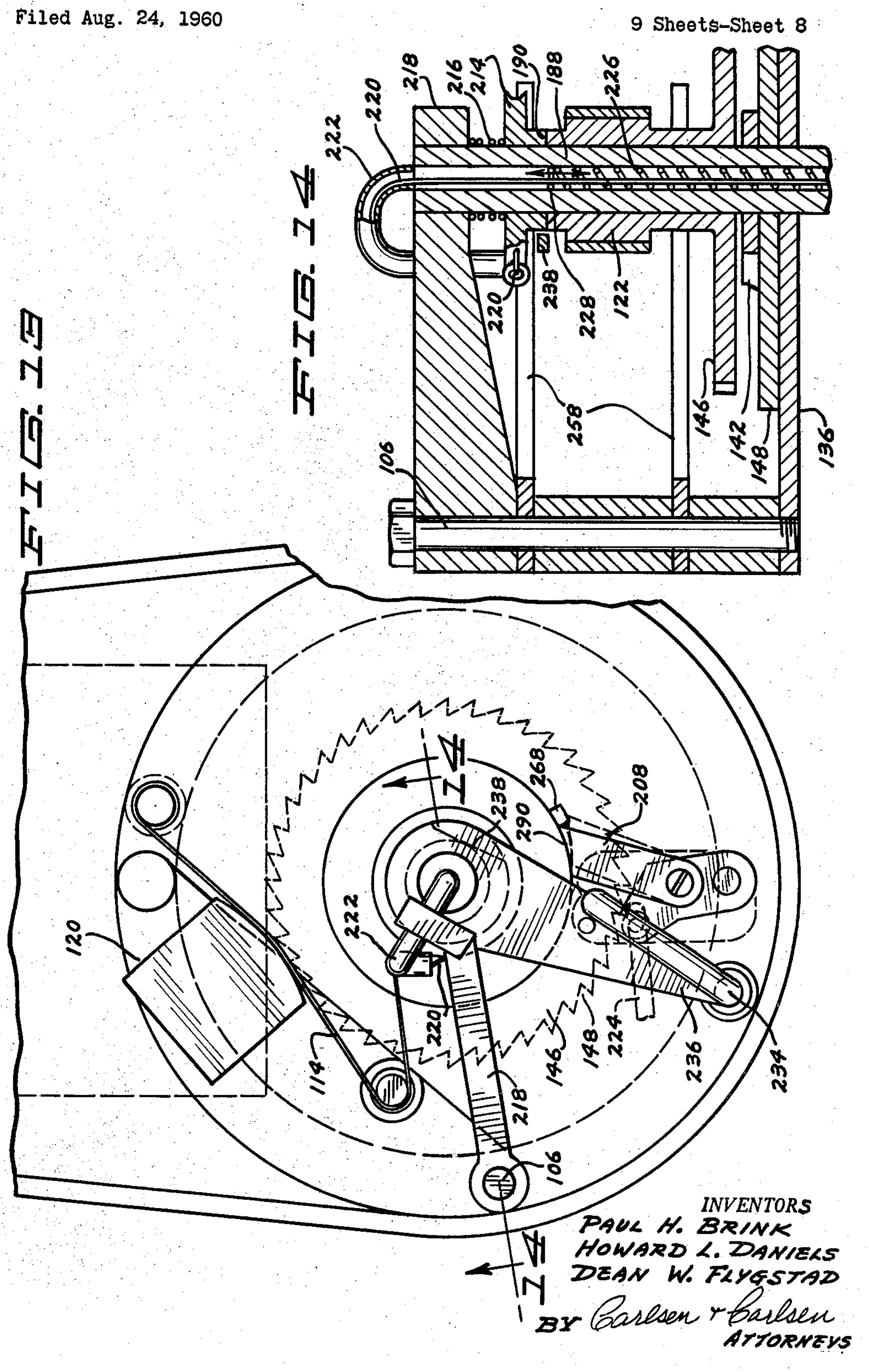
FIG. 13 is a simplified inverted plan view of the FIG. 11 apparatus and taken in the same perspective as FIG. 7.
FIG. 14 is an enlarged and partial vertical sectional view taken in the direction of the arrows along the line 14—14 in FIG. 13 and showing the register input commutator actuating mechanism which is actuated by the tape drive.

The axial movement of the key 194 will first be described. As best seen in FIG. 14 the lower end 190 of the drive roller 122 frictionally engages a pulley wheel 214 which is spring urged thereagainst by a spring 216 disposed against the stationary bracket 218 which extends radially inward from a depending stud 106. The pulley 214 is rotatably mounted on the shaft 188 as shown. A tape 220 is secured to the pulley 214 and movably extends through the tube 222 into the lower end of the shaft 188. The tape 220 extends axially through the shaft 188 and has its other end secured to the key 194 as by the bolt 196 (FIG. 11). From FIG. 14 it should be apparent that as the roller 122 is rotated as aforedescribed by the dial 14 the pulley 214 will urge the tape 220 to axially move the key 194 to the right as viewed in FIG. 11. That is, the roller 122 rotates clockwise as viewed from the frame member 136. It will be remembered that this movement will be a constant amount irrespective of the dial 14 varying angular displacements. Therefore, the key 194 will move from one pulley to the next adjacent pulley each time the dial is rotated for recording a symbol on the respective wheels 176 and on the tape 114. The register consisting of wheels 176 will record each symbol that has been dialed for the maximum of ten symbols, it being understood that ten wheels 176 are shown by way of example only.

The wheels 176 forming the accumulating register may be all reset to the "0" or rest position by dialing the "end of message" symbol or by depressing a release button assembly 224. Two things occur: 1.—the key 194 is returned to the position shown in FIG. 11 and, 2.—all of the wheels 176 return to the zero position.

Upon the later described release of the pulley 214, the key 194 is axially urged toward the FIG. 11 illustrated position by the spring 226 disposed inside the tubular shaft 188 and bearing against the stop 228 (FIG. 14) formed in a lower end portion thereof. As the key 194 is moved by the pulley 214 for commutating the dialed symbols into the wheels 176 the spring 226 is compressed. Depressing the release button 224 causes its end 224A to engage and pivot the lever 230 about its pivot pin 232. The lever 230 cammingly engages the rod 234 for axially moving same to the right as viewed in FIG. 11 for releasing the pulley 214 for back rotation. A radially inwardly extending portion 236 is formed on the lower end of rod 234 and has the bifurcated end portion 238 extending around the clutch 190A formed between the pulley 214 and the roller 122. Moving the end 238 axially against the pulley 214 compresses the spring 216 and disengages the pulley from the surface 190 permitting the pulley to freely rotate. The spring 226 urges the key 194 to quickly return to the illustrated position and back rotates the pulley 214.

Simultaneously therewith the arm 230 axial extension 242 engages each of the brakes 208 for releasing same from the pulleys 186. As best seen in FIG. 11 the pivot pin 232 extends axially between the stationary brackets 240 for pivotably supporting the axially extending arm portion 242 which engages the brakes 208 for releasing same. The brackets 240 also support the brakes 208 on the stud 210 which stationarily extends therebetween. As the arm 230 engages the brakes 208, same are urged away from the pulleys 186 to release same for free back rotation, i.e., rotate counterclockwise as viewed in FIG. 12. Note a stud 241 extends between the brackets 240 for anchoring one end of each spring 212 to provide yieldable urging on the brakes 208 for engaging same with the pulleys. The axial placement of the brakes 208 is maintained by the coaction of the arm 230, brackets 240 and the beveled outer peripheral edges of the respective pulleys 186 as may be seen in FIG. 11.

Referring now to FIGS. 15 and 16 the wheels 176 will be fully described such that it will be clearly understood how the back rotation thereof and the pulleys 186 is accomplished. Each of the wheels 176 is rotatably disposed about a shaft 244 which is journaled at its respective ends in the brackets 246 (FIG. 12) which are supported by the dial housing 44. Each cord 178 is disposed in an annular radially outwardly opening groove 248 and is secured to the pulley wheel as by being glued to a wheel 176 as at 230. It will be remembered that each cord 178 is fixedly secured at its respective ends to both pulley 186 and a wheel 176 such that both will move together. A clock type spring 252 is disposed at one of its ends in a radial slot 254 formed in the shaft 244 and with its other end secured to the wheel 176 as at 256. When the key 194 engages a pulley 186 it is operative to rotate the wheel 176 in the direction of the arrow 258 which compresses the spring 252. When the member 238 (FIG. 14) engages the pulley 214 for permitting same to freely rotate the spring 252 is operative to back rotate the wheel 176 and the associated pulley 186, thereby resetting all wheels 176 to the so-called "rest position."

The symbol indicia 38 are suitably provided on a plastic and annular translucent strip 260 which is adapted to snugly fit over the outer periphery of the wheel 176. A tangential and flat spring member 262 is provided in the annular groove 266 such that its respective end frictionally engage the annular strip 260 for securing same on the wheel. The strip 260 may be circumferentially moved on the wheel 176 for adjusting same such that the symbol zero will be facing upwardly toward the operator when the wheels have been released for back rotation as aforedescribed.

To ensure positive action of the mechanical parts it is desirable that each of the springs 252 exert some back rotational force on the respective wheels even when in the rest position. To accurately position the wheels a stop 268 (FIG. 12) is provided on each of the pulleys 186 and engages the respective brakes 208 as at 270. Note that the brakes 208 have to be moved only very slightly to release the respective pulleys 186 for rotation and as such the stops 268 will not interfere with their release.

The automatic resetting of the commutator key 194 and the wheels 176 will be described. An actuating lobe 272 is provided on an annular washer 274 non-rotatably secured to the shaft 188 adjacent the pulleys 186 as seen in FIG. 11. The washer 274 has a groove identical to the groove 202 as shown in FIG. 12 for each of the pulleys 186. In the rest position the tooth 198 on the key 194 is disposed adjacent to the washer 274. A similar washer 276 is provided on the shaft 188 for axially holding the pulleys 186 in place.

The lobe 272 is stationarily associated with the shaft 188 in the circumferential position illustrated in FIG. 12 which corresponds to the angular section indicative of the "end of message," i.e., the symbol requiring the largest displacement for being recorded in the memory media. When the "end of message" is dialed, the lobe 272 is rotated to the position indicated by the dotted lines 278 to operatively engage the arm 230 inward portion 280 for rotating the ram about the shaft 232 against the brakes 208 for releasing the pulleys 186 and wheels 176 for back rotation as aforedescribed.

The commutator key 194 resetting will now be described. A camming surface 282 is provided on the radial outward end portion of the arm 230 and engages a mating camming surface 284 formed on the upward end of the rod 234, as clearly shown in FIG. 17. The camming surfaces 282 and 284 are merely inclined planes having an axial gradient. As the arm 230 rotates the camming surfaces cooperate to force the rod 234 to axially slide in the axially elongating bushing 286 (FIG. 11) held stationarily in the frame 136. The bushing 286 is operative to prevent the assembly 234, 236 and 238 from rotating as it is operatively engaged by the arm 230. Upon the disengagement of the lobe 272 from the portion 280, as by permitting the dial spring 192 to back rotate the shaft 188, the spring 216 forces the pulley 214 to axially return toward the roller 122 and thereby returns the rod 234 to the illustrated position for restoring the arm 230 to the illustrated position whereby the brakes 208 again exert drag on the pulleys 186.

A stop 288 is provided adjacent the arm 230 for preventing same from rotating out of engagement with the rod 234. As such, the stop 288 may be used to limit the frictional drag exerted by the brake members 208 on the respective pulleys 186. Even though the brakes 208 have their respective engaging surfaces 290 formed to permit rotation of the pulleys 186 in the direction of the arrow 292, excessive drag could cause the dial mechanism to operate in a difficult manner.

Referring to FIG. 11 the rest position of the key 194 will now be described. The spring 226 axially urges the key 194 against the stop 294 formed in the upper portion of the shaft 188 for accurately axially position the key. The tooth 198 is aligned with the annular member 296 which is securely attached to the shaft 188 and has a groove 298 for movably receiving the key. The member 274 together with a similar member 276 axially hold the pulleys 186. As the dial 14 is first rotated the key 194 is moved to the FIG. 11 left most pulley 186 and engages same to rotate the wheel 176 which is left most in FIG. 12. As may be noted the FIG. 12 is a view looking upwardly toward the tower side of the housing 44 therefore the first rotated wheel 176, as viewed in FIG. 1 is at the right hand end of the means 20, as constituted by the mechanical register—and of course which is the usual position for a least significant digit in conventional representations thereof.

Thus it has been shown in modification of the present invention which provides an actuated indication of the symbols dialed the commutating of which is provided in a cooporate relation with the dial actuated tape drive mechanism. In the above described recorder all mechanical movements are caused by the manual rotation of the dial 14 with the only internal energy source required being the battery 34 which is used to provide magnetizing currents and for illuminating the symbol indicia.

It is understood that suitably modifications may be made in the structure as disclosed, provided such modifications come within the spirit and scope of the appended claims. Having now therefore fully illustrated and described our invention, what we claim to be new and desire to protect by Letters Patent is:

1. A tape recorder comprising dial means having a manually rotatable dial and a shaft operatively associated with the dial for rotation therewith, indicator means operatively associated with the shaft and dial means and being responsive to the dial means and shaft rotation to indicate a symbol indicated by said dial rotation, encoding means operatively connected to the shaft, an arm on the shaft having pawl means on its outer end, a stationary cam adjacent the pawl means for cammingly engaging same to force the pawl means to an inoperative position as the shaft is rotated a predetermined amount, a magnetic tape recording means operatively associated with the encoding means and the dial means for recording indicia of the symbol on the tape, and tape drive means for supporting and moving the tape past the recording means and being actuated by said pawl means as the dial is rotated.

2. In a tape recorder, a dial mechanism having a rotatable dial having a rest position and a finger detent, manually actuated switch means in the mechanism adjacent the detent, a shaft operatively associated with the dial for rotation therewith, symbol indicating means in the dial mechanism and being operatively associated with the shaft such that as the switch means is actuated a symbol being dialed is indicated by said means, a record media, encoding and recording means responsively associated with the switch means and operatively associated with the shaft and the media for recording encoded indicia in the media which is indicative of a symbol being dialed, a cam member having a radially extending camming surface, a radial arm member, a drive and holding assembly for transporting said media past the recording means, a pawl on the arm member and being yieldably urged into operative engagement with the drive assembly for imparting movement thereto in a first direction, the cam member being stationarily associated with the housing and the arm member being operatively associated with the shaft for rotation therewith, and said camming edge and the pawl being interengageable such that as the members are relatively moved with respect to each other the edge cammingly engages the pawl for moving same out of operative engagement with the drive assembly each time said dial is rotated away from said rest position whereby the media is moved a constant distance with respect to the recording media each time the dial is so rotated.

3. Apparatus as in the claim 2 wherein the dial, the shaft, the encoding means, the cam member and the drive means are all coaxial with respect to each other.

4. Apparatus as in the claim 2 wherein the detent is pivotably secured to the dial mechanism and operatively connecting to normally open electrical contact means for closing same as the detent is pivoted in a first direction, and said contact means comprising the formerly mentioned switch means.

5. A tape recorder comprising a round dial housing rotatably supporting a manually actuated dial and drive shaft, a plurality of illuminating means disposed in the housing in a circumferentially spaced-apart relation and each of which is arbitrarily assigned as indicating a symbol when illuminated, a finger detent pivotably secured to the housing and extending to be closely adjacent the dial at a predetermined peripheral circumferential location, electrical switch means inside the housing and operatively associated with the detent for closing as the detent is pivoted in a first rotational sense, a circular contact plate stationarily associated with the housing and having a like plurality of electrical contact forming conductive areas circumferentially spaced apart thereon and being disposed concentrically with the shaft, a power source electrically associated with the switch means, an electrical contact forming brush stationarily secured to the shaft for rotation therewith and being in slidable engagement with said plate for engaging its conductive areas and being electrically connected to the switch means, each area being electrically connected to one of the illuminating means, the illuminating means each being associated with the power means for completing an electrical circuit, an encircling commutator formed with said brush in electrical connection therewith and being rotatable with the shaft, recording means stationarily associated with the housing and responsively connected to the commutator, a magnetic tape movably disposed adjacent the recording means, tape drive means mounted on the housing and operatively supporting the tape, the drive means including a unidirectional rotatable ratchet wheel disposed coaxially with the shaft, pawl means on the shaft, and rotatable therewith and engaging the ratchet wheel for rotating same with the shaft, and cam means on the housing and being disposed in engaging relation to the pawl means such that as the dial is rotated through a predetermined angle the pawl is disengaged from the ratchet wheel whereby the tape is moved a constant distance each time the dial is rotated.

6. A recorder as in claim 5 wherein the cam is disposed with respect to the pawl means such that as the dial is rotated the pawl means is disengaged from the ratchet wheel before the detent is pivoted for actuating the switch means to actuate an illumination means and the recording means.

7. A self-checking dial input, comprising a dial housing, dial means rotatably disposed on the housing and having a rest position, a plurality of indicator means in the housing, a commutator member operatively associated with the dial means for movement therewith and having a plurality of sections corresponding to various angular displacements of the dial means from its rest position including electrical contact means in each section for indicating the angular displacement of the dial means and further contact means movable with said commutator member, a stationary contact member on the housing and having a like plurality of contact means respectively electrically coupled to the indicator means and the contact member being disposed adjacent the commutator member such that said further contact means slidably engages the contact member for making engagement with its contact means, recording means operatively associated with the commutator member, power means, and a manually actuated switch on the housing for closing electrical circuits between the power means and commutator and contact members and the indicator means for indicating the angular displacement of the dial means, and a second circuit between the power means and the commutator member and recording means for recording a symbol therein indicative of said angular displacement.

8. A self-checking dial input, comprising a dial housing, dial means rotatably disposed on the housing and having a rest position, a plurality of indicator means in the housing, a binary encoding commutator operatively associated with the dial means for movement therewith including a plurality of contact means corresponding to various angular displacements of the dial means from its rest position and further contact means movable with said commutator, a stationary contact plate on the housing and having a like plurality of contact means respectively electrically coupled to the indicator means and the plate being disposed adjacent said further contact means such that the commutator contact means slidably engages the plate for making electrical engagement with one of its contact means, recording means operatively associated with the commutator, power means, a pivotably mounted finger detent in the housing adjacent the dial means, and a finger detent actuated switch on the housing for closing electrical circuits between the power means, commutator, plate and indicator means for indicating the angular displacement of the dial means and a second circuit between the power means, commutator and recording means for recording a binary encoded symbol therein indicative of said angular displacement.

9. A self-checking dial input comprising a dial housing, dial means rotatably disposed on the housing and having a rest position, a plurality of indicator means in the housing, a commutator disk non-rotatably associated with the dial means including a plurality of angular and radially extending sections each with contact means and corresponding to various angular displacements of the dial means from its rest position and further contact means stationarily associated with said disk, a stationary and annular contact plate on the housing and having a like plurality of contact means respectively electrically coupled to the indicator means and the plate being disposed adjacent the disk such that said further contact means slidably engages the plate for making engagement with its contact means, the dial means, disk and plate being on a common axis, recording means operatively associated with the disk, power means, and a finger detent operated switch on the housing for closing an electrical circuit between the power means, disk, plate and indicator means for indicating the angular displacement of the dial means and a second circuit between the power means, disk, and recording means for recording a symbol therein indicative of said angular displacement.

10. In a portable tape recorder, dial means being rotatable from a rest position through selective angular displacements, pawl means operatively associated with the dial means for movement therewith and including a radically-movable actuating member, toothed means engageable with the actuating member and being movable thereby in a first direction, cam means adjacent the actuating member and being slidably engaging therewith as the dial is rotated from its rest position to a predetermined angular position for urging the actuating member away from the toothed means for disengaging same to limit the movement of the toothed means to a predetermined and constant movement for each dial rotation, and tape drive means operatively associated with the toothed means.

11. In a portable tape recorder, a rotatable dial means being movable toward and away from a rest position in manually selective angular displacements for dialing selected symbols a radially extending arm non-rotatably associated with the dial means, a tape drive roller co-axially disposed with respect to the dial means and having a ratchet wheel disposed adjacent the arm, spring biased pawl means pivotably mounted on the arm for yieldably engaging the ratchet wheel for rotating the roller in a first rotational sense, a stationary cam co-axially disposed adjacent the wheel and having a radially inward extending camming recess circumferentially located in a predetermined relationship to said rest position, and the pawl means continuously riding on the cam such that it engages the ratchet wheel only when passing by the recess whereby the roller is rotated a predetermined and constant amount each time the dial is rotated irrespective of the angular displacement of the said dial.

12. In a portable tape recorder, dial means being rotatable from a rest position through selective angular displacements, pawl means operatively associated co-axially with the dial means for rotation therewith and having a radially movable spring-urged actuating member, toothed wheel means engageable with the actuating member and being movable thereby in a first direction, stationary cam means adjacent the actuating member and being continuously slidably engaged therewith and having a radially extending camming edge disposed at a predetermined angular position for urging the actuating member outwardly out of engagement with the toothed wheel means to limit the movement of the toothed means to a predetermined rotation during the initial portion of each dial rotation, and tape drive means operatively associated with the toothed means.

13. Apparatus as in the claim 12 further including a spring detent means continuously engaged with the toothed wheel means for inhibiting rotation in a direction opposite to said first direction.

14. In a compact manually-actuated data recorder comprising a frame having an aperture, two co-axial and relatively rotatable shafts rotatably disposed co-axially with and one of which extends through the aperture, actuating means operatively associated with a first one of the shafts, a tape drive roller comprising the second one of the shafts, a radially outwardly extending arm non-rotatably secured to the first one of shafts, a pawl pivotably secured to the arm in a radial outward end portion and the arm including means radially inwardly spring-urging the pawl, a ratchet wheel non-rotatably secured to the roller and operatively engaged with the pawl, and circular cam means stationarily associated with the frame co-axially of the aperture and having a radially outwardly extending camming edge adjacent the pawl in engaging relation with the arms such that as the arm rotates in a first direction a predetermined angular displacement the pawl engages the camming edge for being disengaged from the ratchet wheel whereby the tape drive roller is rotated a limited and constant amount irrespective of varied angular displacements of the first shaft.

15. In a compact manually-actuated data recorder comprising a frame having an aperture, a manually rotatable shaft disposed through the aperture, manual actuating means operatively associated with the shaft, a tape drive roller rotatably mounted co-axially of the shaft and adjacent the frame, a radially outwardly extending arm non-rotatably secured to the axially intermediate the frame and the roller shaft, an axially extending pawl pivotably secured to the arm at its radial outward end portion for rotation toward and away from the shaft and the arm including means radially inwardly spring-urging the pawl, a ratchet wheel non-rotatably secured to the roller intermediate the arm and the roller and operatively engaged with the pawl, and cam means stationarily associated with the frame adjacent the arm and having a radially outwardly extending camming edge adjacent the pawl in engaging relation therewith such that as the shaft rotates in a first direction a predetermined angular displacement the pawl engages the camming edge for being disengaged from the ratchet wheel whereby the tape drive roller is rotated a limited and constant amount irrespective of varied angular displacements of the shaft.

16. Apparatus as in the claim 15 further including a stationary friction drag engaging the roller and wherein the roller is rotatably mounted on said shaft.

17. A magnetic tape recorder comprising a case having a palm receiving recess for being manually held, manually rotatable dial means on the case, a frame member inside the case and stationarily associated with the dial means in parallel spaced-apart relation, and having an aperture coaxially disposed with respect to the dial means, a shaft operatively associated with the dial means for rotation therewith and extending through the aperture, a plurality of symbol indicating means in the dial means, commutator means non-rotatably secured to the shaft and being operatively associated with the respective indicating means of actuating same to visually indicate a symbol indicative of the dial means rotational displacement, a tape mechanism disposed adjacent the frame member and including a tape movement drive means co-axially disposed with respect to the aperture and operatively engaged with said shaft for rotation therewith in a first sense, and camming means in the tape drive for operatively disengaging same from the shaft as the shaft rotates past a predetermined angle from a rest position.

18. In a tape recorder having a rotatable dial input mechanism with a drive shaft, a plurality of indicia bearing wheels independently rotatably mounted on the recorder, a like plurality of pulley means rotatably disposed co-axially of the shaft, separate means operatively connecting the pulleys to the respective wheels, and commutator means operatively associated with the shaft and having axially movable tooth means non-rotatably associated on the shaft and the commutator means being responsive to rotation of the dial input mechanism for axially moving the tooth means from one pulley means to an adjacent pulley means such that successive dial rotations cause the tooth to move from one pulley means to the next whereby the wheels are rotated amounts indicative of the dial rotations for moving a symbol indicia to an observable location on the recorder.

19. Apparatus as in the claim 18 further including pulley means and hold means for preventing rotation thereof in opposition to the shaft rotation, a cam on the shaft being engageable with said hold means upon a predetermined shaft rotation for effectively disengaging the pulley means from the hold means for permitting said opposite rotation, and spring means operatively associated with each of the wheels for urging same to rotate whereby the pulleys are rotated in said opposite direction.

20. In a tape recorder having a rotatable dial mechanism having a drive shaft operatively associated therewith for rotation, a tape having a recording surface thereon, means for movably holding the tape, drive means for moving the tape including means operatively associated with said drive shaft for rotation therewith in a first sense only through a predetermined angular amount whereat the drive means are effectively disengaged from the shaft, clutch means on the drive means, a plurality of indicia bearing wheels independently rotatably mounted in the recorder commutator, means carried on said shaft and selectively and operatively associatable with said wheels for imparting rotation thereto indicative of said dial rotations and being engageable by said clutch means for axially changing the operative association of the commutator means with successive wheels for each dial rotation and means for holding the respective wheels in a rotated position after being operatively associated with the commutator means.

21. Apparatus as in the claim 20 wherein the commutator means, tape drive means and clutch means are all coaxial with said shaft.

22. For a data input system having a movable dial input having a shaft which is rotated by the dial movement from a rest position predetermined angular amounts in a first rotational sense for indicating symbols dialed, a plurality of wheels each of which bear indicia of the symbols to be dialed in any one dial movement, a like plurality of pulley means independently rotatably mounted on said shaft, drag means yieldably engaging said pulley means for inhibiting rotation thereof, shaft rotation sensing means operatively associated with the shaft for movement in a first direction a constant and predetermined distance each time the dial is moved, for indicating a symbol, commutator key means axially movably disposed with respect to the shaft and being rotatable therewith, and selectively engageable with said pulley means, spring means yieldably urging the key means toward a shaft one end, the sensing means being operatively engaged with the key means for axially moving same in opposition to the yieldable urging into successive operative engagement with the pulleys for each dial movement whereby each wheel is rotated for a successive dial movement for indicating successive dialed symbols.

23. Apparatus as in the claim 22 wherein the shaft rotation sensing means includes disengageable clutch means, lever means operatively connected to the drag means and clutch means for respectively releasing and disengaging same, and spring means operative upon release of the drag means for returning the wheels to a new rotated position simultaneously with the first mentioned spring means urging the key to the shaft one end whereby the wheels and commutator are reset to an initial position.

24. For a tape recorder having a dial input with a tubular rotatable shaft with an axially elongated slot, an axially movable key disposed inside the shaft and having a tooth radially extending through the slot and being axially movable therein, drive means operatively associated with the shaft and connected to the key for axially moving the key in a first direction a constant and predetermined amount each time the shaft is rotated such that a symbol may be indicated thereby, a plurality of independently rotatable pulleys disposed about the shaft over the slot and each having an annular groove facing to one axial side of the pulley with a notch extending axially across the inner side of the pulley and being contiguous with said groove, a stop in each groove, and the pulleys being positioned on the shaft such that the notches are aligned with the slot when the shaft is in a rest position and the stops are disposed circumferentially therefrom a predetermined distance in a second direction whereby each pulley is rotated in the second direction as the tooth respectively engages said stop as the shaft is rotated in said second direction.

25. Apparatus as in the claim 24 further including a friction drag associated with each pulley for yieldably inhibiting rotation thereof.

26. Apparatus as in the claim 25 including first spring means yieldably urging the pulleys in a direction opposite to the second direction and each pulley having a radial outer stop for engaging the respective drags whereby a rest position is defined for each of said pulleys.

27. Apparatus as in the claim 26 further including a manually actuated button means operatively associated with the drags for releasing the pulleys for free rotation.

28. Apparatus as in the claim 26 further including drag release means operatively associated with the drags, a radially outwardly extending lobe on the shaft and disposed to engage the release means when the shaft has been rotated its greatest rotational displacement for releasing the pulleys for rotation whereby said spring means rotates the pulleys to said rest position.

29. Apparatus as in the claim 28 wherein the drive means includes a disengageable clutch for disengaging the shaft from the key connection, a rod operatively associated with the clutch for disengaging same, the release means having an inclined surface with an axial gradient at a radial outward end portion, the rod axially extending from the clutch and having an inclined surface with an axial gradient slidably engaging the release means plane such that as the release means releases the pulleys the inclined planes mutually slide on each other to axially urge the rod to disengage the clutch, and axial spring means in the drive means yieldably urging the key to axially move in a direction opposite to said first direction.

30. Apparatus as in the claim 28 further including a like plurality of independently rotatable symbol bearing wheels about a common shaft tapes connecting each of the wheels to the respective pulleys such that said wheel and pulley rotate together, and the first spring means comprising a clock type spring respectively connected to the wheels and to the common shaft such that the wheel and pulley are yieldably urged to rotate the radial stop against the respective drag means.

References Cited in the file of this patent

UNITED STATES PATENTS

| | | |
|---|---|---|
| 1,713,276 | Goeckler | May 14, 1929 |
| 2,280,613 | Arey | Apr. 21, 1942 |
| 2,416,692 | Hersey | Mar. 4, 1947 |
| 2,502,517 | Goldberger | Apr. 4, 1950 |
| 2,767,243 | Steeneck | Oct. 16, 1956 |
| 2,794,861 | Heine | June 4, 1957 |
| 2,823,344 | Ragland | Feb. 11, 1958 |
| 2,953,647 | Johanson | Sept. 20, 1960 |